A. C. BOSEL.
COLLAPSIBLE TRAP NEST.
APPLICATION FILED MAY 9, 1921.

1,413,894.

Patented Apr. 25, 1922.
2 SHEETS—SHEET 1.

Inventor
Albert C. Bosel.

Watson E. Coleman
Attorney.

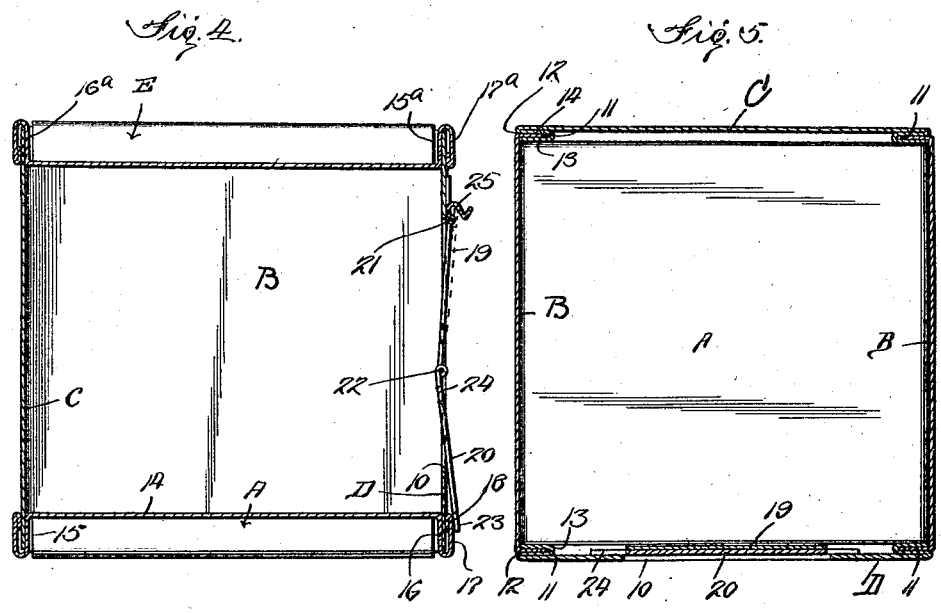

UNITED STATES PATENT OFFICE.

ALBERT C. BOSEL, OF CROSBY, MINNESOTA.

COLLAPSIBLE TRAP NEST.

1,413,894. Specification of Letters Patent. Patented Apr. 25, 1922.

Application filed May 9, 1921. Serial No. 467,922.

*To all whom it may concern:*

Be it known that I, ALBERT C. BOSEL, a citizen of the United States, residing at Crosby, in the county of Crow Wing and State of Minnesota, have invented certain new and useful Improvements in Collapsible Trap Nests, of which the following is a specification, reference being had to the accompanying drawings.

This invention relates to trap nests, and the general object of the invention is to provide a trap nest so constructed that it is collapsible and, when collapsed, may have its sections packed in compact shape for transportation.

A further object is to provide a trap nest of this character with a trap door in one of the sections of the nest so constructed that when raised it will permit the entrance of the hen to the nest but that the hen on entering the nest will release the trap door, which will immediately fall and prevent the exit of the hen, and in this connection to provide a trap door so constructed that it will lie flat and almost in the same plane as the section of the nest in which the door is formed so that this door section and the other body sections of the nest may be packed flat against each other for transportation.

And a further object is to provide a trap nest of this character which is very simple in construction, which may be cheaply made, which is relatively light, and which may be readily transported.

My invention is illustrated in the accompanying drawings, wherein:—

Figure 4 is a vertical section from front to rear showing the door closed;

Figure 5 is a horizontal section;

Figure 6 is a sectional view showing the various parts collapsed ready for packing;

Figure 7 is a fragmentary detail section showing in full lines the door latched in open position, in dotted lines the position taken by the door when a hen enters the nest and the door is released, and in dot and dash lines the door as it is dropping to the position shown in Figure 4.

Figure 2:
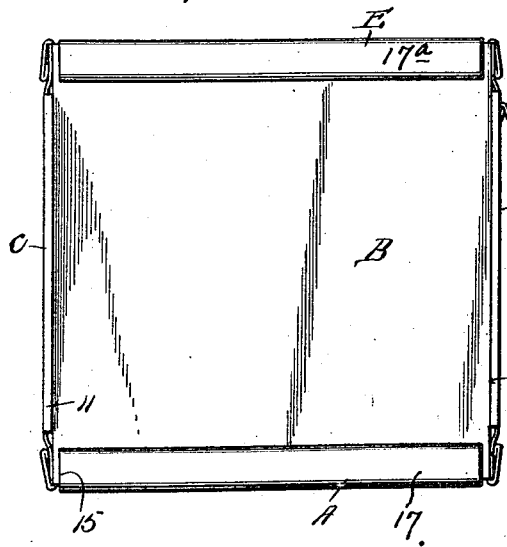
Figure 2 is a side elevation thereof.
Figure 3:
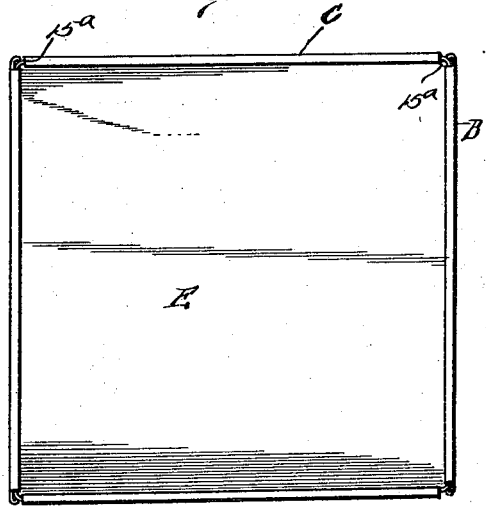
Figure 3 is a top plan view thereof.

Referring to these drawings, it will be seen that my trap nest consists of a bottom section A, the two side sections B, the back section C, the front section D, and the top section E. The front section D is provided with a door opening 10 and a trap door operating therewith, as will be later described. The side sections B are formed each of a thin sheet of metal approximately 12 x 12, though the sheets may be of other dimensions and of any desired gauge, the forward and rear ends of the sheet being angularly bent, as at 11 (see Figure 5). The rear section C has the same height as the lateral sections B, but the lateral ends of the rear section are formed to provide strips which are bent inward, as at 12, against the face of the section and then again bent outward, as at 13, providing a groove 14 between these two parts 12 and 13 within which the rear flanges 11 of the members B may be received. These bent portions 12 and 13, as will be obvious from Figure 2, do not have a length equal to the height of the section C but are less in length than the height of the section C so that the upper end of the section C projects above the locking portions and the lower end of the section C projects below the locking portions. The front section D is also formed with the bends 12 and 13 to receive the front flanges 11 of the side sections and these also have a length less than the height of the section B.

The bottom A is formed of a sheet of metal 14 which is slitted at the corners, as at 15, and the metal at the margins of the plate 14 and between these slits is downwardly bent, as at 16, then upwardly bent, as at 17, to form a channel and the upper margin of the portion 17 is bent flat down on the inner face of the portion 17 to form a bead 18. All four sides of the bottom A are constructed alike in this respect. The top E is of the same character as the bottom, except that it is reversed, that is the corners of the metal are slitted, as at 15ª, and the flanges 16ª are bent upward instead of downward as they are in the bottom section, while the flanges 17 are bent downward instead of upward as they are in the bottom section so as to form a downwardly opening channel. The upwardly opening channel formed around the side margins of the bottom receive the lower ends of the side sections B and the lower ends of the front and rear sections C and D. The downwardly opening channels formed around the top receive the upper ends of the side, rear and front sections in a manner which will be obvious from Figure 4. This detachable interlocking of the front, rear and side sections and the bottom and top sections permits all of these sections to be disengaged from each other and packed flat against each other for storage and shipment, thus greatly economizing space and expense.

The section A, as before remarked, is formed with a door opening 10 by which access is had to the interior of the nest. This door opening coacts with a door formed in two sections 19 and 20. The section 19 is hinged in any suitable manner, as by means of the hinge 21, to the metal above the door opening. The section 20 is hinged to the section 19 by the hinge 22. This section 20 is of sufficient length so that when the section 19 is depending in a vertical position, and the section 20 is depending in a vertical position, the lower portion of the section 20 will be just above the bottom of the nest as in Figure 4. The lower end of the section 20 is provided with the laterally extending ears 23. The section 20 has a width approximately equal to the width of the doorway 10, and these ears 23 project outwardly beyond the doorway and engage with the outer face of the jamb. Below the upper edge of the section 20 there are provided the laterally projecting ears 24 which are disposed on the inside of the front plate and form stops limiting the outward movement of the upper portion of the lower section 20 and the outward movement of the section 19. Preferably formed in one piece with the hinge 21 is a downwardly and forwardly curved resilient tongue 25 which, when the door sections are raised, is adapted to engage the free edge of the door section 20, as illustrated in Figure 7.

Figure 1:
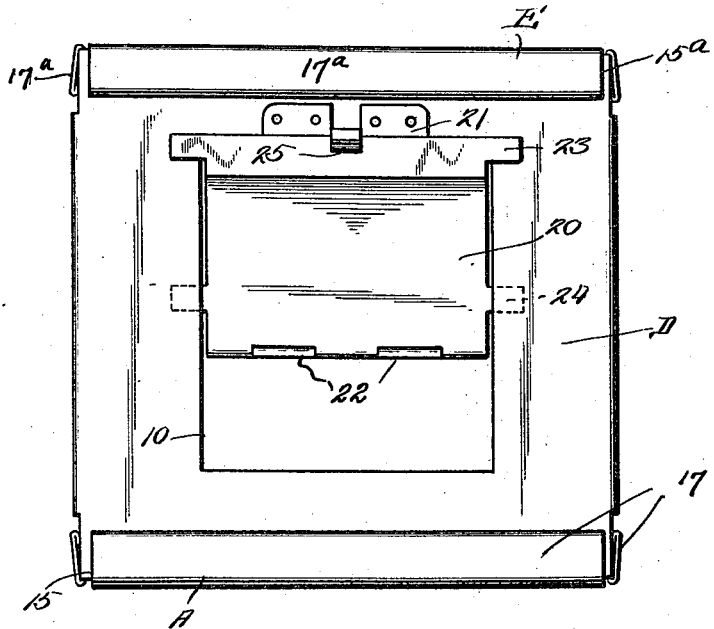
Figure 1 is a front elevation of a trap nest constructed in accordance with my invention.

Assuming that this trap nest has been set up in the manner described and as illustrated in Figure 1, then the door is raised, that is the lower section 20 of the door is lifted up. This forces the section 19 inward and upward and the section 20 is folded up until its free edge comes beneath the tongue or latch 25. This prevents the downward dropping of the section 20 and the section 19 and the lower end of the section 20 swings outward to the position shown in Figure 7. Now if a hen enter the nest, the hen strikes the hinged ends of the sections 19 and 20 and raises the hinged or connected ends of these sections until the free edge of the section 20, releases its engagement with the tongue 25, and when the hen has entered the nest then the section 20 will drop, drawing the section 19 to a vertical position, as illustrated in Figure 4, and the hen cannot get out. Obviously the dropping of the door will show that the hen has entered the nest and is laying. Then if the door be raised after the hen has laid, the eggs may be counted and track thus kept of the number of eggs laid by the hen. When the door is lowered, it is obvious that the hen cannot raise the door, while when the door is raised free access is had to the nest. At the same time the door is held in its raised position so lightly that it is readily disengaged by a touch. By reason of the fact that the door lies almost entirely in the same plane with the plate constituting the front section D, it is obvious that this door will form no obstruction to the nesting of the several sections against each other for packing and transportation.

It will be seen that I have provided a collapsible nest which can be readily taken apart and may be thoroughly cleaned for this reason, and which, as it is made of sections, may be readily packed for shipment, making a neat, flat bundle, that there are no bolts, screws or wires to fasten the same together, and that there is nothing to get out of place or be lost. All the parts are interchangeable so that no difficulty is found in setting up the nest. It will be seen also that the door is so constructed that it cannot damage or injure the hen in any way when it falls. Preferably these nest boxes will be 12 x 12 x 12, but obviously they may be formed of any suitable dimensions.

I claim:—

1. A nest box of the character described formed of a plurality of relatively flat, detachably engaged plates, the front plate having a door opening, a door section hinged to the upper wall of the door opening, a second door section hinged to the free edge of the first door section and extending downward outside of the door opening and having laterally projecting ears extending beyond the line of the door opening, said second named section adjacent its upper end being provided with laterally projecting ears projecting on the inside of the front member beyond the door opening, and a latching tongue projecting above the door opening and adapted to engage the free edge of the second named section when the second named section is folded upward against the first named section to thereby hold the sections in folded position.

2. A trap box of the character described having a door opening, a door formed of two sections hinged to each other, the upper section being hinged to the upper edge of the door opening, means connected to the lower section engaging the lower edge of the door with the outer face of the door jambs, means permitting the inward movement of the hinged ends of the sections but preventing their outward movement beyond the face of the door jambs, and resilient means disposed at the upper end of the door opening adapted to engage the free edge of the door section and detachably hold said sections in folded position until the folded sections are moved inward at their lower edges.

In testimony whereof I hereunto affix my signature.

ALBERT C. BOSEL.